(12) United States Patent
Matsui

(10) Patent No.: US 7,869,075 B2
(45) Date of Patent: Jan. 11, 2011

(54) IMAGE PROCESSING APPARATUS AND METHOD THEREOF

(75) Inventor: Nobuaki Matsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 11/693,778

(22) Filed: Mar. 30, 2007

(65) Prior Publication Data

US 2007/0229888 A1 Oct. 4, 2007

(30) Foreign Application Priority Data

Mar. 31, 2006 (JP) .............................. 2006-100402

(51) Int. Cl.
 *G06F 15/00* (2006.01)
 *G06F 3/12* (2006.01)
 *G06K 1/00* (2006.01)
(52) U.S. Cl. .................................... 358/1.15; 358/1.13
(58) Field of Classification Search ................... 358/1.1, 358/1.15, 1.13, 1.18, 1.11, 1.4
See application file for complete search history.

(56) References Cited

U.S. PATENT DOCUMENTS

2006/0132857 A1* 6/2006 Akashi ........................ 358/448
2006/0171588 A1* 8/2006 Chellapilla et al. ........... 382/185

* cited by examiner

*Primary Examiner*—Douglas Q Tran
(74) *Attorney, Agent, or Firm*—Fitzpatrick, Cella, Harper & Scinto

(57) ABSTRACT

When rasterized text is pasted on a picture image included in a print image, image processing for a picture region is applied to the print image, thus deteriorating the image quality of a text region. Print data is input from the exterior, and objects included in the print data are rendered to generate image data for print. Attribute information of each object is appended to the image data for print, and the image data appended with the attribute information is stored in a memory. Image data indicating a picture attribute is extracted from the rendered image data for print. The extracted image data is segmented into region. Attribute information of image data of a region of a text attribute, which is divided in the segmentation, is rewritten to a text attribute.

16 Claims, 19 Drawing Sheets

PRINT DATA
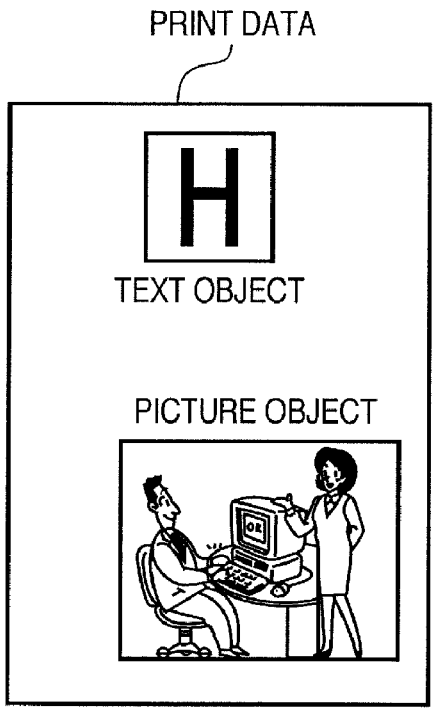
TEXT OBJECT
PICTURE OBJECT
F I G. 2A
PRINT IMAGE
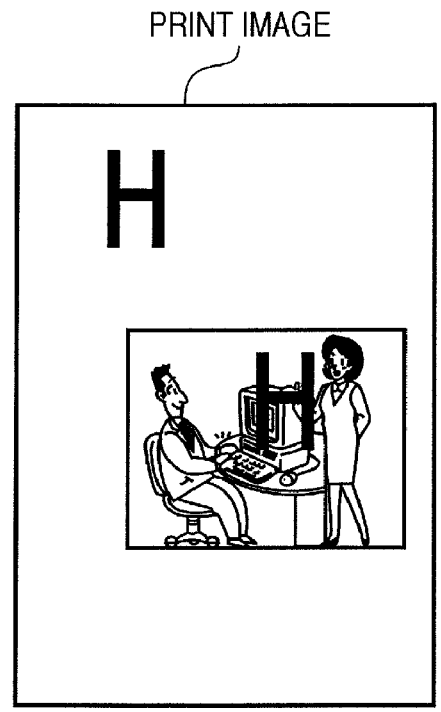
F I G. 2B
REGION INFORMATION
```
0 0 0 0 0 0 0 0 0 0 0 0 0
0 0 0 1 1 0 0 0 0 0 0 0 0
0 0 0 1 1 0 0 0 0 0 0 0 0
0 0 0 1 1 0 0 0 0 0 0 0 0
0 0 0 1 1 0 0 0 0 0 0 0 0
0 0 0 0 0 0 0 0 0 0 0 0 0
0 0 0 0 0 0 0 0 0 0 0 0 0
0 0 0 0 2 2 2 2 2 2 2 2 0
0 0 0 0 2 2 2 1 1 2 2 2 0
0 0 0 0 2 2 2 1 1 2 2 2 0
0 0 0 0 2 2 2 1 1 2 2 2 0
0 0 0 0 2 2 2 1 1 2 2 2 0
0 0 0 0 2 2 2 1 1 2 2 2 0
0 0 0 0 2 2 2 2 2 2 2 2 0
0 0 0 0 2 2 2 2 2 2 2 2 0
0 0 0 0 2 2 2 2 2 2 2 2 0
0 0 0 0 0 0 0 0 0 0 0 0 0
0 0 0 0 0 0 0 0 0 0 0 0 0
0 0 0 0 0 0 0 0 0 0 0 0 0
0 0 0 0 0 0 0 0 0 0 0 0 0
0 0 0 0 0 0 0 0 0 0 0 0 0
```
0 : NO REGION INFORMATION
1 : TEXT REGION
2 : PICTURE REGION
F I G. 2C

PRINT IMAGE

REGION INFORMATION

0 : NO REGION INFORMATION
1 : TEXT REGION
2 : PICTURE REGION

0 : NO REGION INFORMATION
1 : TEXT REGION
2 : PICTURE REGION

0 : NO REGION INFORMATION
1 : TEXT REGION
2 : PICTURE REGION

0 : NO REGION INFORMATION
1 : TEXT REGION
2 : PICTURE REGION

PRINT DATA
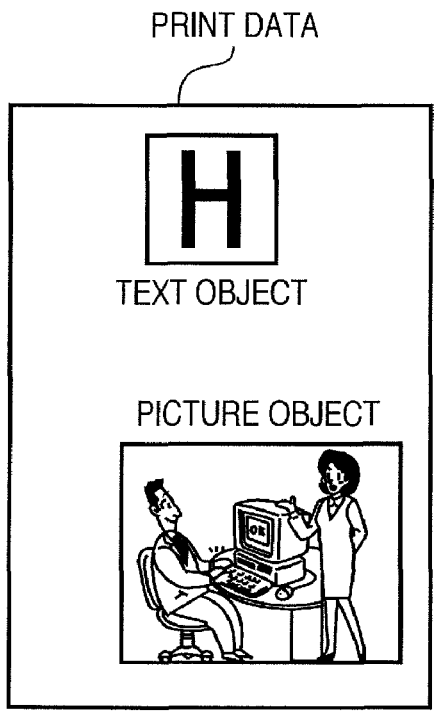
TEXT OBJECT
PICTURE OBJECT
F I G. 10A
PRINT IMAGE
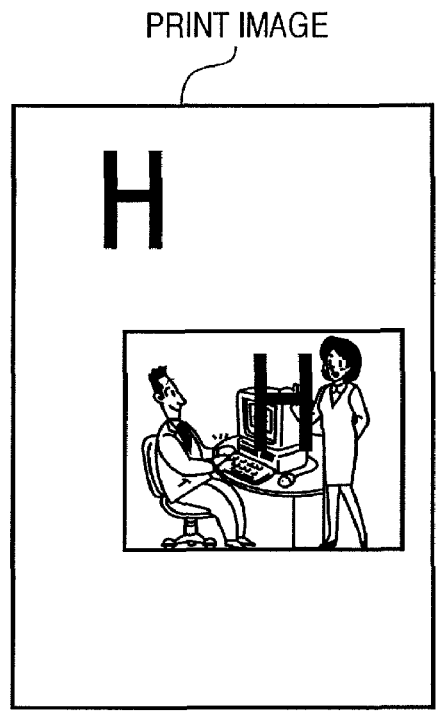
F I G. 10B
ATTRIBUTE MAP
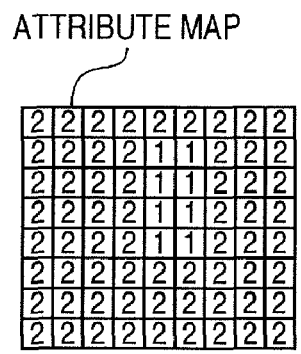
F I G. 10C
REGION INFORMATION
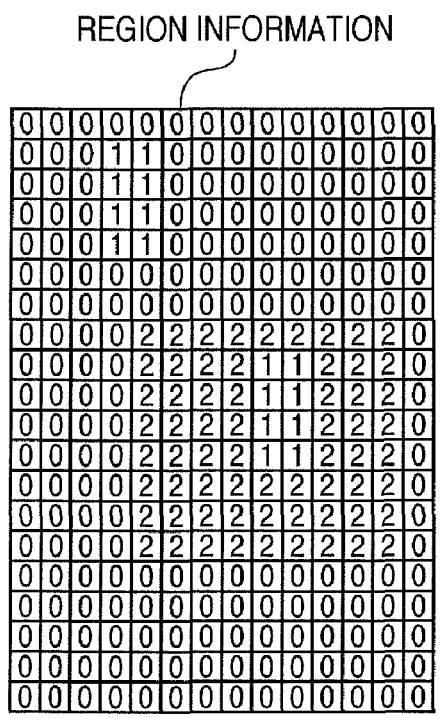
0 : NO REGION INFORMATION
1 : TEXT REGION
2 : PICTURE REGION
F I G. 10D

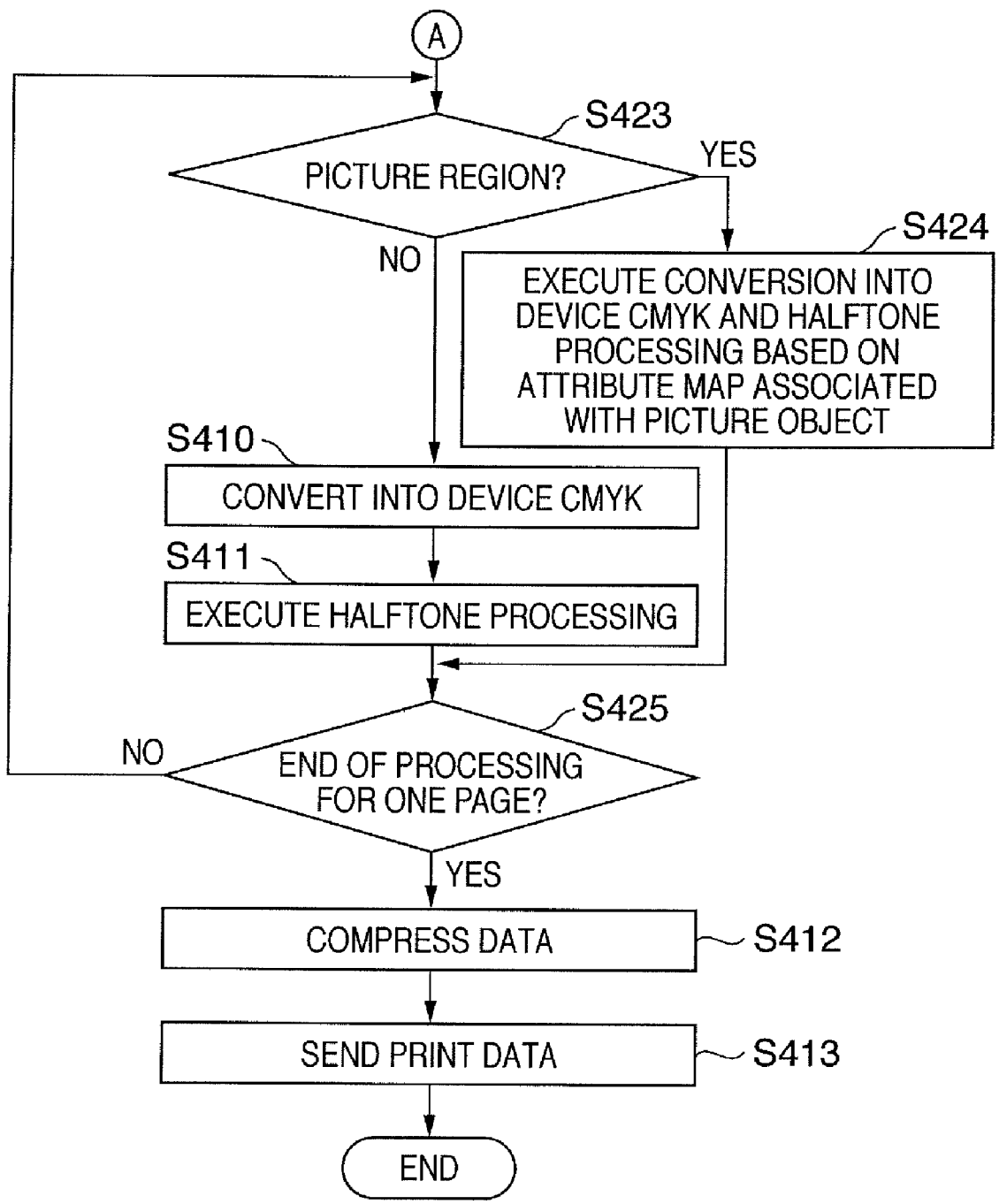
F I G. 17B

IMAGE PROCESSING APPARATUS AND METHOD THEREOF

BACKGROUND OF THE INVENTION

1. Field of the Invention

The present invention relates to image processing for executing processes according to the attributes of image regions.

2. Description of the Related Art

A color copying machine segments a scan image into regions, and appends region information indicating a text region or picture region to each segmented region. By switching the image processes of respective regions in accordance with the region information, suited image processes are respectively applied to the text region and picture region, thus obtaining a satisfactory print image.

A color printer renders and prints an image in accordance with print data which is input from a computer and is described in a language such as the page description language (PDL). In this case, since attributes (text, graphics, picture, and the like) of rendering objects are designated in the print data, the printer can obtain region information for each rendering object without region segmentation unlike in the color copying machine. The color printer appends region information for respective images obtained by rendering the rendering objects, and switches image processes in accordance with the region information to apply suited image processes to the text region and picture region, thus obtaining a satisfactory print image.

FIG. 1 is a block diagram showing the arrangement of a multi-functional peripheral equipment (MFP).

A printer driver, which runs on a computer 101, converts print instructions of application software (AP), which also runs on the computer 101, into print data, which is received by an MFP 102 via a network 100. The print data includes objects such as text, graphics, picture image, and the like.

A processor 108 as a controller of the MFP 102 stores the print data, which is received via a network interface card (NIC) 105, in a memory 107 via a crossbar switch 106. The processor 108 converts the print data stored in the memory 107 into a display list. The display list holds information such as text, graphics, and picture image, print of which is instructed by the AP of the computer 101.

A rendering processor 109 reads out the display list from the memory 107, and generates a print image by rendering objects according to the display list. Upon rendering the print image, the rendering processor 109 sets region information indicating text and picture based on the attributes of objects used to render respective images which form a print image, and appends the region information for each pixel.

Upon completion of rendering or when a print image storage area of the memory 107 is full of data, the processor 108 reads out the print image (or its some data) from the memory 107. The processor 108 spools the readout data on a hard disk drive (HDD) 111 via the crossbar switch 106 and a serial ATA interface (SATA I/F) 110. After that, the processor 108 reads out the spooled print image from the HDD 111, and transfers the readout image to the memory 107 via the SATA I/F 110 and crossbar switch 106 again, thus starting printing.

A printer 104 starts in response to an instruction from the processor 108, and feeds a paper sheet. After that, the print image is input to the printer 104 via the memory 107, the crossbar switch 106, an image processor 112 for the printer, and a printer I/F 113, and is printed. When the print image has the RGB data format, the image processor 112 converts the RGB data format into the CMYK data format. At the same time, the image processor 112 executes image processes such as gamut mapping (e.g., from sRGB to device CMYK), under color removal (UCR), masking, gamma correction, and the like according to the characteristics of the printer 104. These processes implement image processes suited to respective regions by switching color conversion tables in accordance with the region information appended to each pixel of the print image.

Upon reception of a copy instruction, the MFP 102 inputs a scan image scanned by a scanner 103 to an image processor 115 for the scanner via a scanner I/F 114. The image processor 115 executes image processes such as gamut mapping (from device RGB to, e.g., sRGB), resolution conversion, region segmentation, and the like according to the characteristics of the scanner 103, and stores the scan image that has undergone the image processes in the memory 107 via the crossbar switch 106. Each pixel of the scan image that has undergone the image processes is appended with region information indicating a text region or picture region by the region segment processing.

Upon completion of storage of the scan image in the memory 107, or when a scan image storage area of the memory 107 is full of data, the processor 108 reads out the scan image from the memory 107. The processor 108 spools the readout image in the HDD 111 via the crossbar switch 106 and SATA I/F 110. After that, the processor 108 reads out the spooled scan image from the HDD 111, and transfers it to the memory 107 again via the SATA I/F 110 and crossbar switch 106, thus starting printing. The subsequent processes are the same as those upon printing print data received from the computer 101.

Note that the printer I/F 113 and scanner I/F 114 use, e.g., a serial bus such as USB (Universal Serial Bus), IEEE1394, or the like.

FIGS. 2A to 2C show the relationship among print data, a rendered print image, and region information.

The print data shown in FIG. 2A includes independent text and picture objects, and also includes position information and size information required upon rendering these objects. Furthermore, the print data includes layout information between the objects, which indicates which object is located at an upper or lower position. The rendering processor 109 renders these objects according to the description of the display list to generate the print image shown in FIG. 2B. Then, the rendering processor 109 appends region information corresponding to the attributes of objects to each pixel, as shown in FIG. 2C.

FIG. 3 is a view for explaining the data format of the print image, and shows the data configuration of one pixel. One pixel data has, e.g., 8-bit region information attr in addition to, e.g., 8-bit R, G, and B data.

FIG. 4 is a flowchart showing the processing executed when the image processor 112 converts pixel data in the RGB format into CMYK data.

The image processor 112 inputs pixel data in the RGB format (S1), and checks with reference to the region information attr included in the pixel data if that pixel belongs to a text region (S2). If the pixel belongs to the text region, the image processor 112 sets a conversion table for the text region (S3); otherwise, it sets a conversion table for a picture region (S4). The image processor 112 converts the pixel data in the RGB format into CMYK data using the set conversion table (S5). The image processor 112 repeats this processing to all pixel data of the print image.

However, when the AP of the computer 101 issues a print instruction of a raster image or issues that of a scan image of a scanner connected to the computer 101, print data including only objects of a picture attribute is input to the MFP 102. To this picture image, rasterized text may be pasted like the print image shown in, e.g., FIG. 2B. However, since the print data indicates a picture attribute, even if it includes text, a print image in which region information indicating a picture region is appended to pixels is generated. As a result, the print image is applied with the image processing suited to the picture region, and is printed. Therefore, the image quality of its text region deteriorates.

SUMMARY OF THE INVENTION

In first aspect, the present invention inputting print data from the exterior; rendering objects included in the print data to generate image data for print; appending attribute information indicating attributes of the objects to the image data for print of the objects, and storing the image data for print appended with the attribute information in a memory; extracting image data indicating a picture attribute from the rendered image data for print; and segmenting the image data extracted in the extracting step into regions.

In second aspect, the present invention inputting print data from the exterior; extracting an object of a picture attribute from the print data; segmenting the object extracted by the extractor into regions, and generating an attribute information map of the object; rendering objects included in the print data to generate image data for print; and appending, when an object has an attribute other than a picture attribute, attribute information indicating the attribute of the object to the image data for print of the object, and appending, when an object has the picture attribute, attribute information according to the attribute information map to the image data for print of the object.

In third aspect, the present invention inputting graphics commands; determining an attribute of an object whose rendering is designated by the graphics commands; segmenting the object, for which the determination result indicates a picture attribute, into regions, generating an attribute information map of the object, and associating the attribute information map and the object; and generating print data including the object whose rendering is designated by the graphics commands and the attribute information map.

According to the above aspect, an object of a text attribute included in an object of a picture attribute can be separated, and image processing suited to the object of the text attribute can be applied.

Further features of the present invention will become apparent from the following description of exemplary embodiments with reference to the attached drawings.

BRIEF DESCRIPTION OF THE DRAWINGS

FIGS. 2A to 2C show the relationship among print data, a rendered print image, and region information;

FIGS. 10A to 10D show the relationship among print data, a rendered print image, an attribute map, and region information when print data including an object of a picture attribute on which rasterized text is pasted is input to the MFP;

FIGS. 17A and 17B are flowcharts for explaining the processing of a printer driver according to the fourth embodiment.

DESCRIPTION OF THE EMBODIMENTS

Image processing according to embodiments of the present invention will be described in detail hereinafter with reference to the accompanying drawings.

First Embodiment

Figure 1:
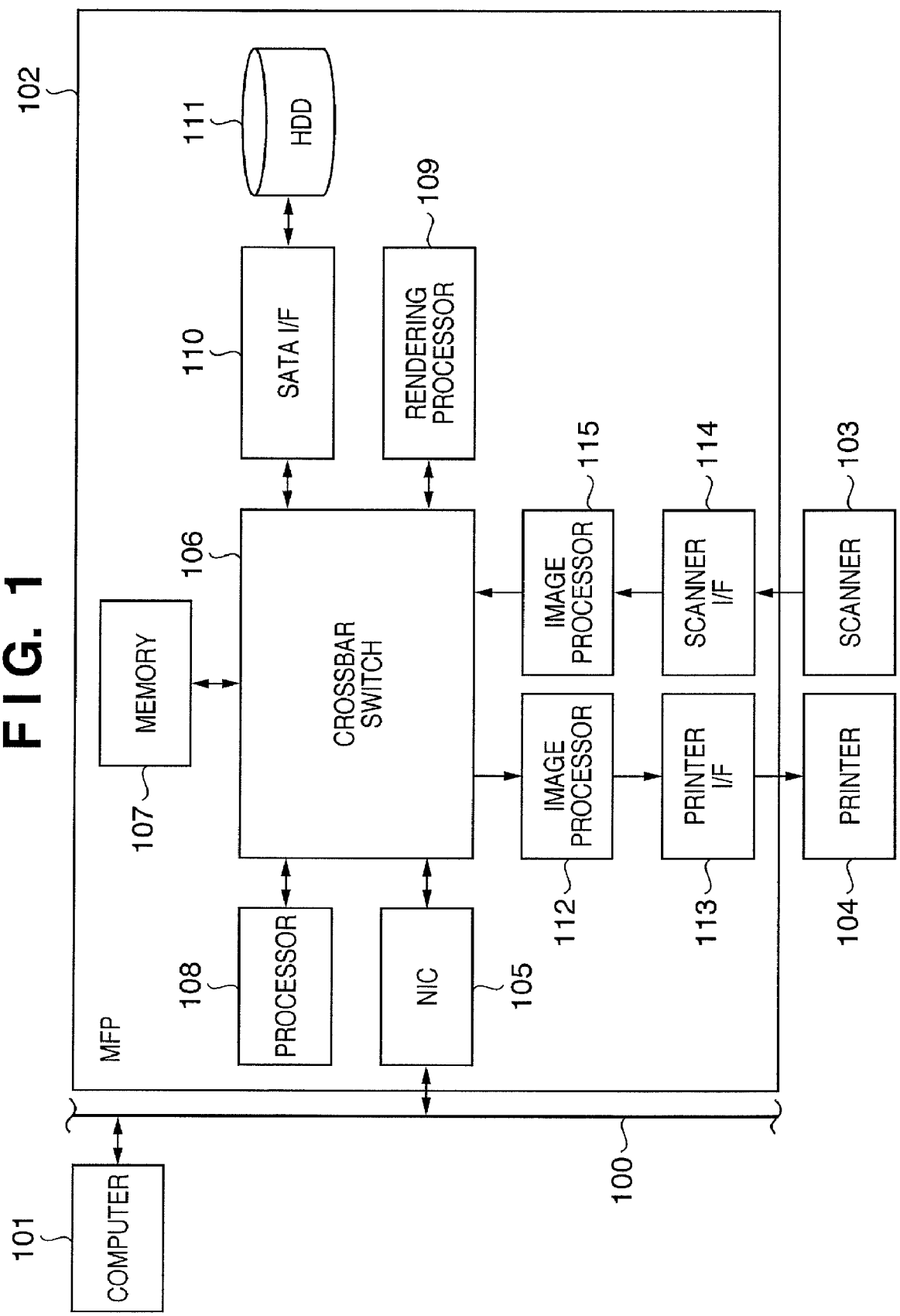
FIG. 1 is a block diagram showing the arrangement of an MFP.
Figure 3:
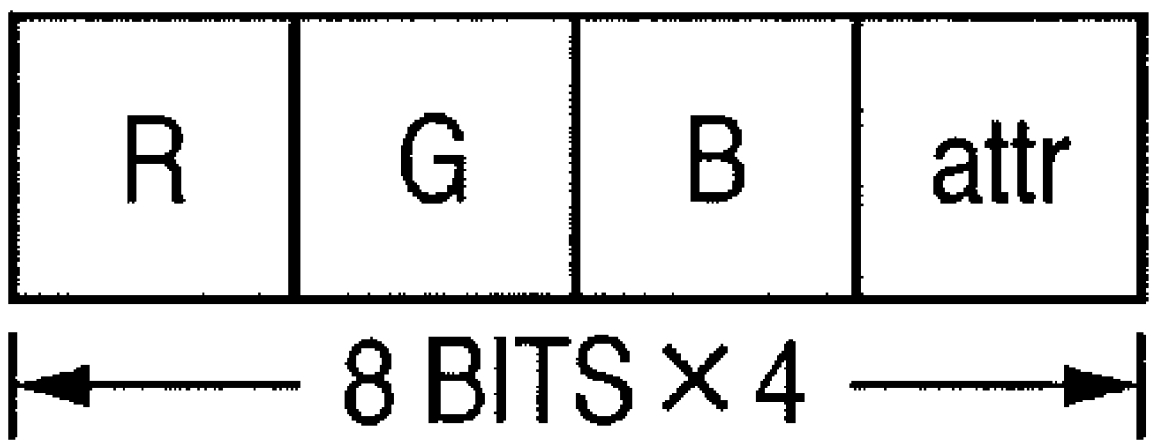
FIG. 3 is a view for explaining the data format of a print image.
Figure 4:
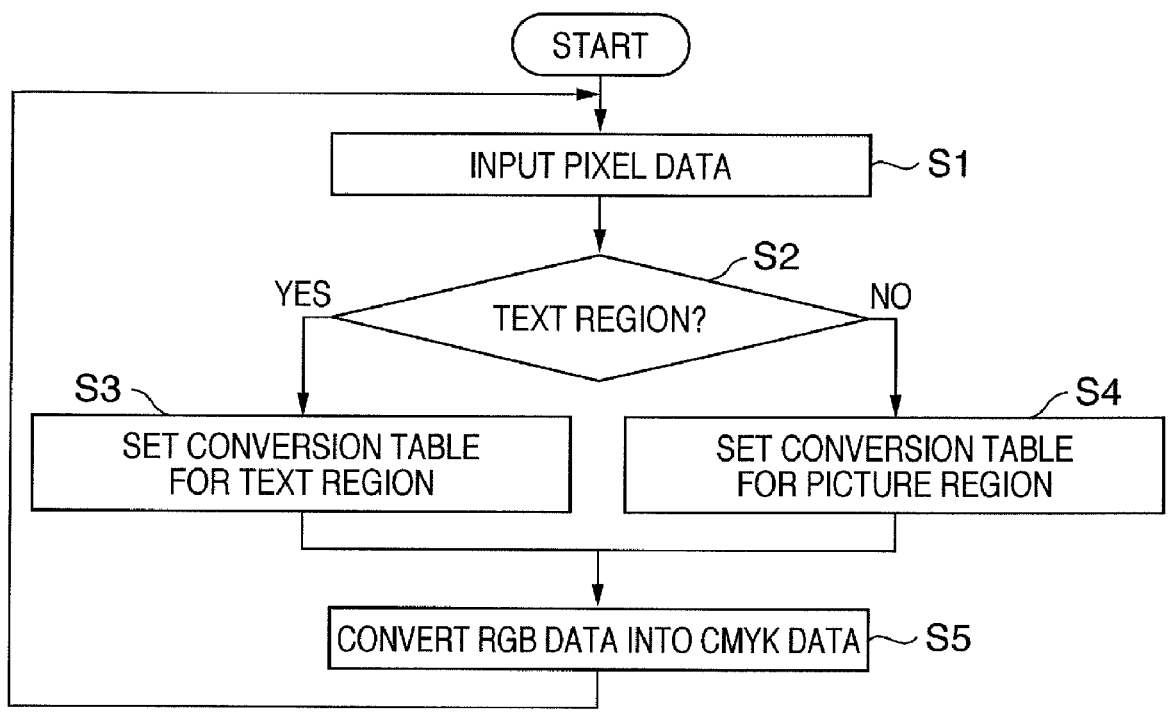
FIG. 4 is a flowchart showing the processing executed when an image processor converts pixel data in the RGB format into CMYK data.
Figure 5:
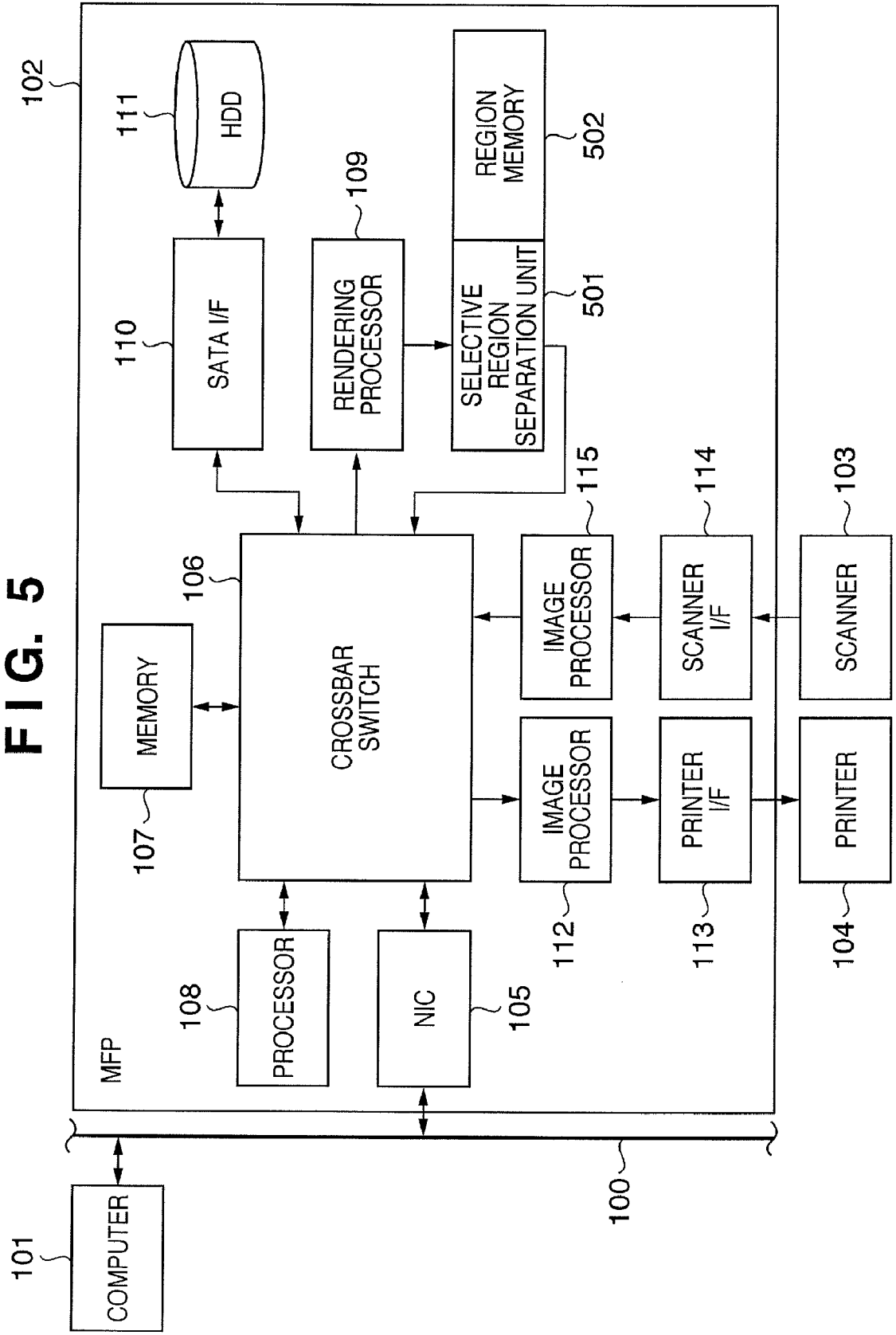
FIG. 5 is a block diagram showing the arrangement of an MFP according to the first embodiment.

FIG. 5 is a block diagram showing the arrangement of an MFP according to the first embodiment. Note that the same reference numerals in FIG. 5 denote the same components as those in FIG. 1, and a detailed description thereof will be omitted.

A selective region separation unit 501 inputs a print image rendered by a rendering processor 109 for respective pixels. The unit 501 transfers pixel data whose region information indicates other than a picture region to a memory 107 via a crossbar switch 106. The unit 501 transfers pixel data whose region information indicates a picture region to the memory 107 via the crossbar switch 106, and stores that pixel data at an address of a region memory 502, which corresponds to the pixel position of that pixel.

The region memory 502 may be a page memory or may be a band memory which stores a part of a page in a band shape to suppress its memory capacity. Upon completion of rendering for one page in case of a page memory, or upon completion of rendering for one band width in case of a band memory, the selective region separation unit 501 applies region segmentation processing to the image stored in the region memory 502. Upon detection of a text region, the unit 501 reads out pixel data which belongs to the text region from the region memory 502, and rewrites its region information attr to indicate a text region. The unit 501 overwrites the pixel data whose region information attr is rewritten at the address of the memory 107, which corresponds to the pixel position of that pixel via the crossbar switch 106.

Figures 6A, 6B, 6C:
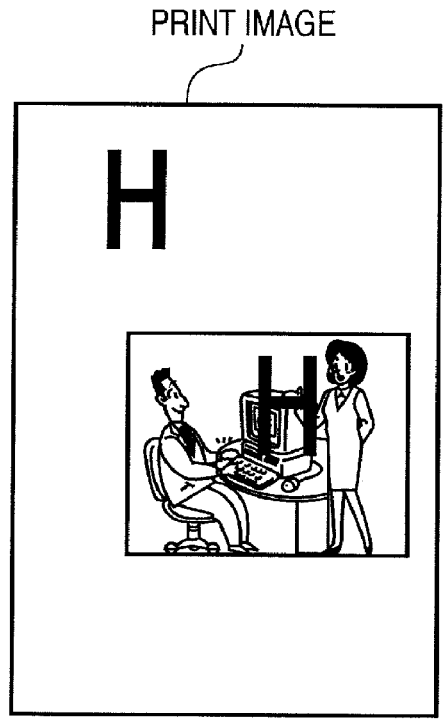
FIGS. 6A to 6C show the relationship among print data, a rendered print image, and region information when print data including only an object of a picture attribute is input to the MFP.

FIGS. 6A to 6C show the relationship among print data, a rendered print image, and region information when print data including only an object of a picture attribute is input to the MFP 102. An object of a picture attribute included in the print data is the same as the print image (FIG. 6A). Therefore, all pieces of region information attr generated by the rendering processor 109 assume a value ("2" in FIG. 6B) indicating a picture region. The selective region separation unit 501 detects a text region included in the picture region of the rendered picture image, and rewrites the region information attr of the detected text region ("1" in FIG. 6C). As a result, the region information indicating the text region can be obtained, as shown in FIG. 6C.

Figure 7A:
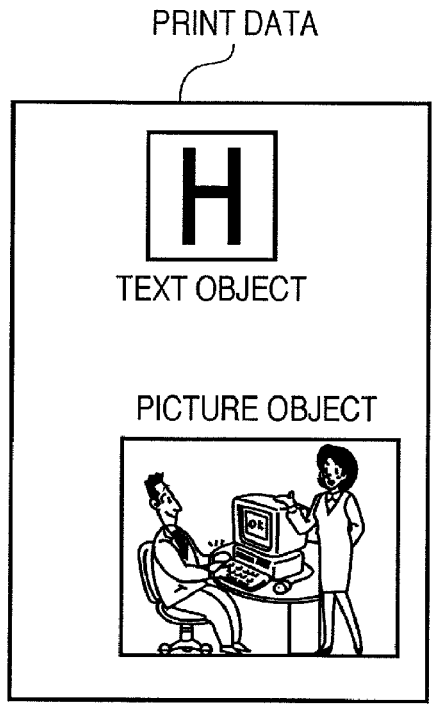
FIGS. 7A to 7D show the relationship among print data, a rendered print image, and region information when print data including an object of a picture attribute on which rasterized text is pasted is input to the MFP.
Figure 7B:
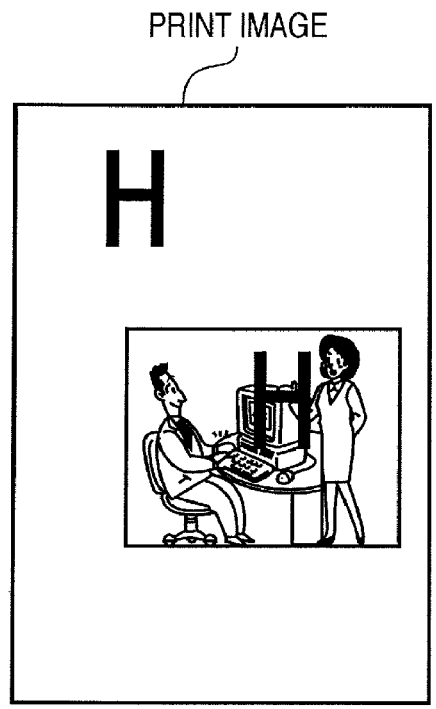
Figure 7C:
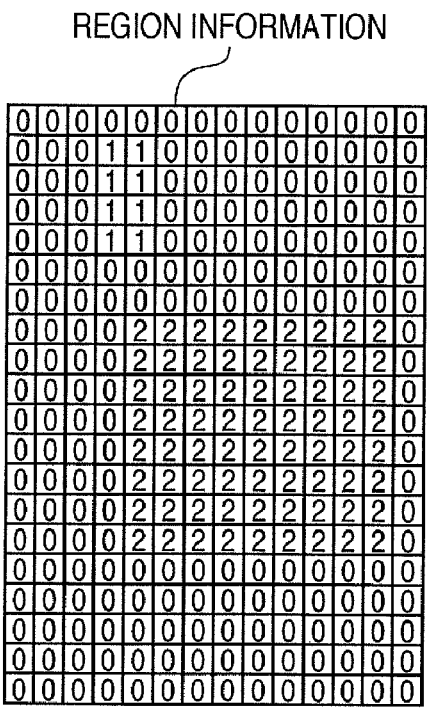
Figure 7D:
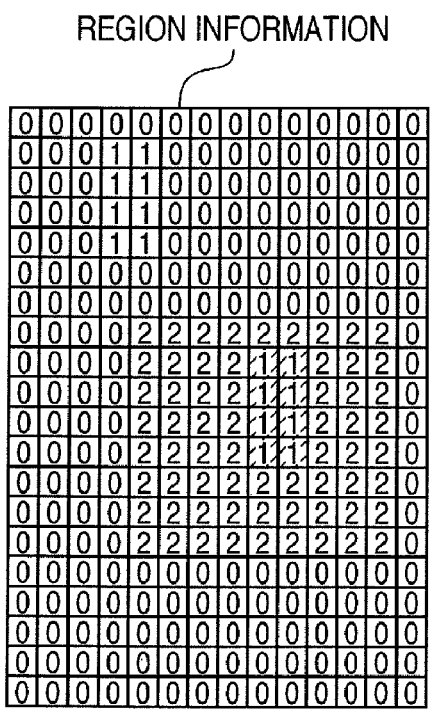

FIGS. 7A to 7D show the relationship among print data (FIG. 7A), a rendered print image (FIG. 7B), and region information when print data including an object of a picture attribute on which rasterized text is pasted is input to the MFP 102. Region information attr generated by the rendering processor 109 indicates a text region and picture region, as shown in FIG. 7C. However, a region of text pasted on the picture region assumes a value ("2" in FIG. 7C) indicating a picture region. The selective region separation unit 501 detects a text region from the picture region of the rendered print image, and rewrites the region information attr of the detected text region ("1" in FIG. 7D). As a result, region information indicating the text region pasted on the picture region can be obtained, as shown in FIG. 7D.

Figure 8:
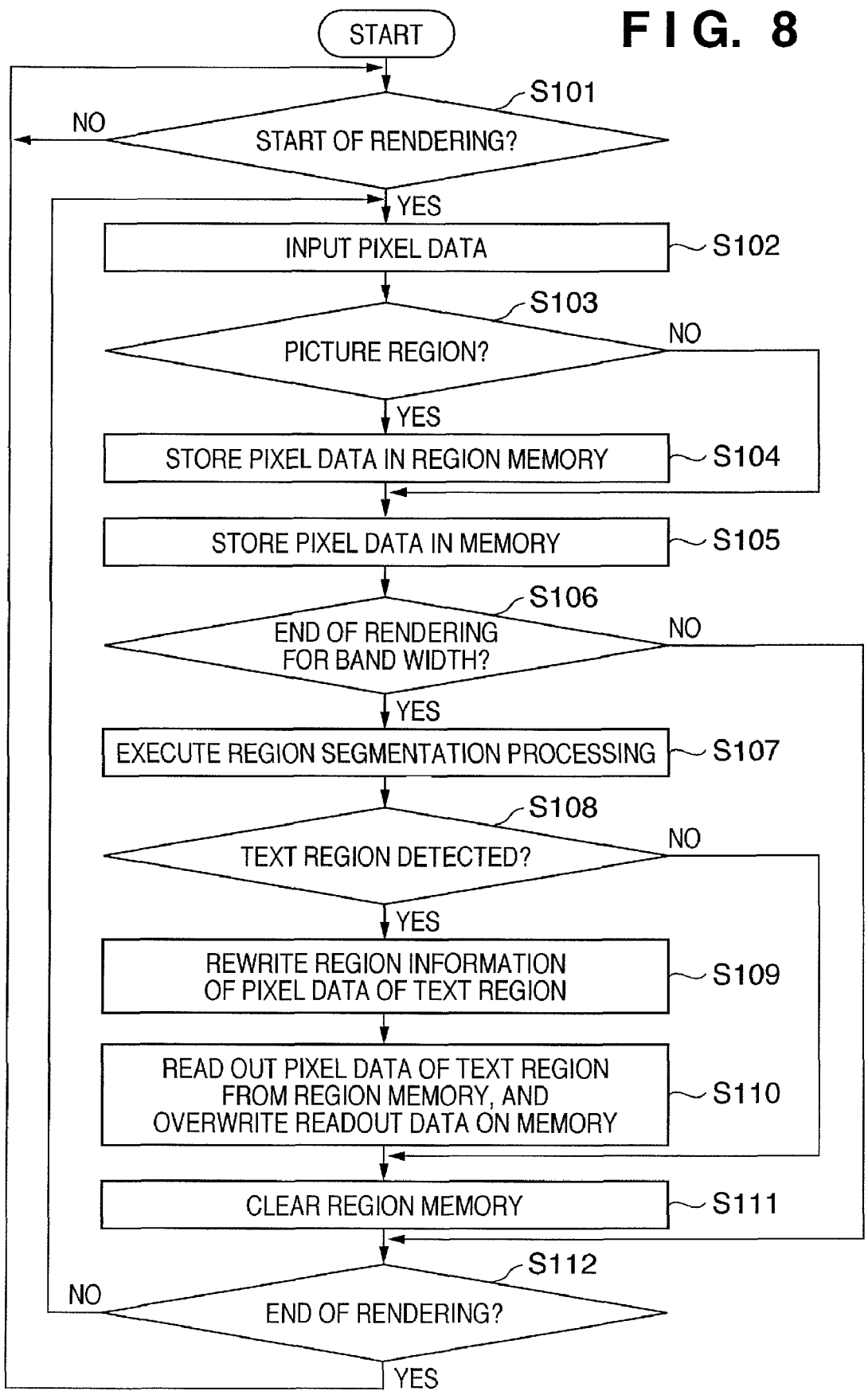
FIG. 8 is a flowchart showing the processing of a selective region segmentation unit.

FIG. 8 is a flowchart showing the processing of the selective region separation unit 501, and shows the processing when the region memory 502 is a band memory.

Upon starting rendering by the rendering processor 109 (S101), the selective region separation unit 501 inputs pixel data (S102). The unit 501 checks with reference to the region information attr of the pixel data if the input pixel data belongs to a picture region (S103). If the input pixel data belongs to a picture region, the unit 501 stores the pixel data at a corresponding address of the region memory 502 (S104).

The selective region separation unit 501 transfers the input pixel data to the memory 107 (S105), and checks if rendering for one band width is complete (S106). If rendering for one band width is not complete yet, the process advances to step S112; otherwise, the unit 501 executes region segmentation processing to the image stored in the region memory 502 (S107). The unit 501 checks if the image includes a text region (S108). If the image does not include any text region, the unit 501 clears the region memory 502 (S111).

If the image stored in the region memory 502 includes a text region, the selective region separation unit 501 rewrites region information of the pixel data of the text region (S109). The unit 501 reads out pixel data which belong to the text region from the region memory 502, overwrites them on the memory 107 (S110), and clears the region memory 502 (S111).

The selective region separation unit 501 checks if rendering is complete (S112). If rendering is not complete yet, the process returns to step S102; otherwise, the process returns to step S101.

Note that the selective region separation unit 501 manages the band size or the band order of image data so as to specify the overwrite address of the memory 107, needless to say. In order to accurately execute region segmentation processing at the division of the band, image data for several lines at the end side of the previous band is preferably left in a predetermined area of the region memory 502.

As described above, when print data input from the computer 101 includes only an object of a picture attribute or an object of a picture attribute, which includes rasterized text, the text region and picture regions are separated, and the image processes are switched according to the region information. Therefore, image processes respectively suited to the text region and picture region can be applied, and a satisfactory print image with high image quality can be obtained.

Second Embodiment

Image processing according to the second embodiment of the present invention will be described hereinafter. Note that the same reference numerals in the second embodiment denote the same components as those in the first embodiment, and a detailed description thereof will be omitted.

Figure 9:
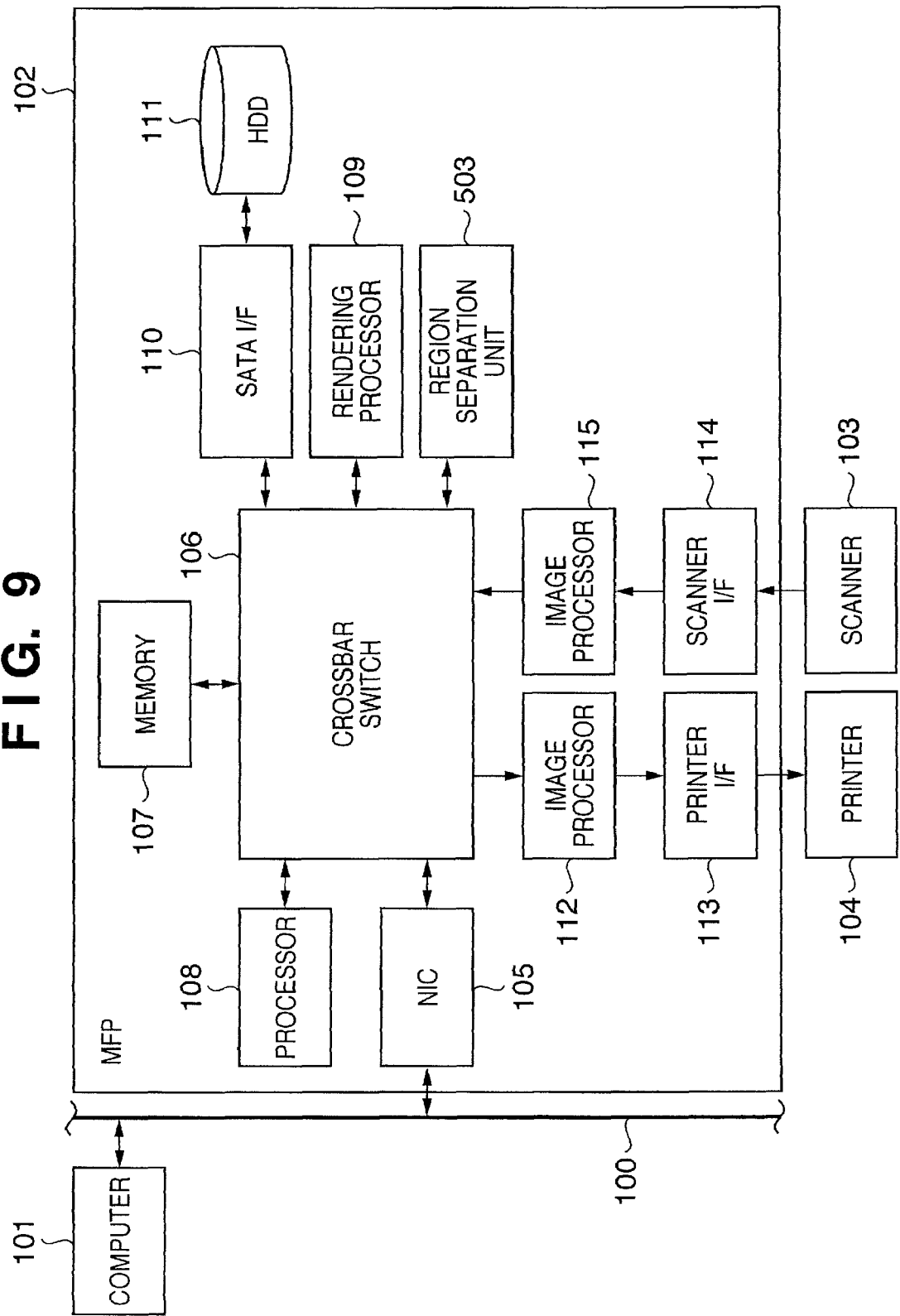
FIG. 9 is a block diagram showing the arrangement of an MFP according to the second embodiment.

FIG. 9 is a block diagram showing the arrangement of an MFP of the second embodiment.

Upon generation of a display list, a processor 108 inputs a picture object included in print data to a region separation unit 503. The region separation unit 503 applies region segmentation processing to the input picture object (picture image), and stores region information obtained by the region segmentation processing in a memory 107 as an attribute map.

The processor 108 adds a link to the attribute map stored in the memory 107 to the description of the display list corresponding to the picture object.

A rendering processor 109 reads out the display list from the memory 107, and renders a print image. In this case, the rendering processor 109 generates region information attr in the rendered image based on the attribute map linked to the picture object in place of generation of region information attr indicating a picture region.

FIGS. 10A to 10D show the relationship among print data (FIG. 10A) including an object of a picture attribute on which rasterized text is pasted, a rendered print image (FIG. 10B), an attribute map, and region information. The rendering processor 109 generates region information attr with reference to the attribute map (FIG. 10C). As a result, region information indicating a text region pasted on a picture region can be obtained.

Figure 11A:
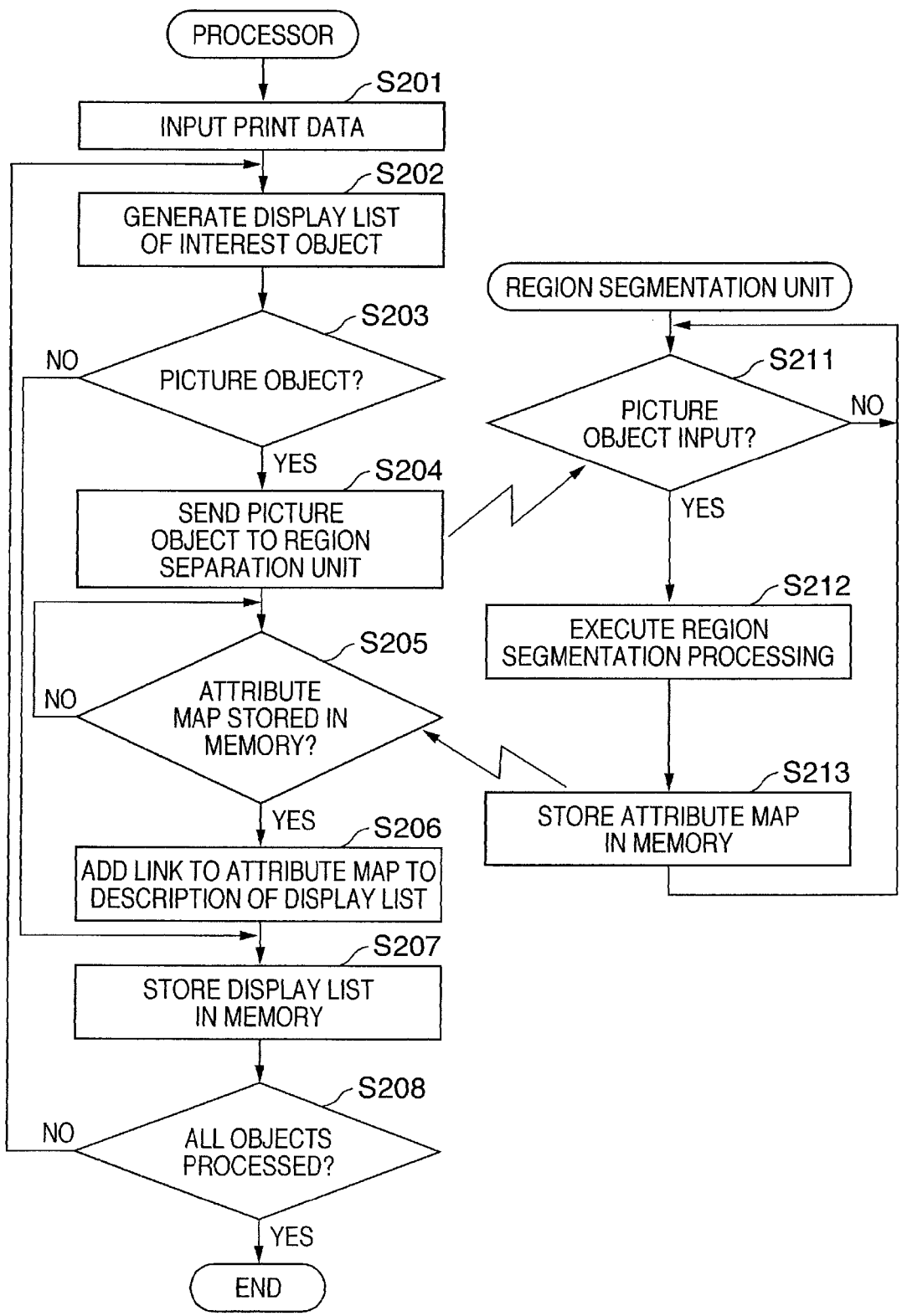
FIG. 11A is a flowchart showing the processing of a processor and region segmentation unit.
Figure 11B:
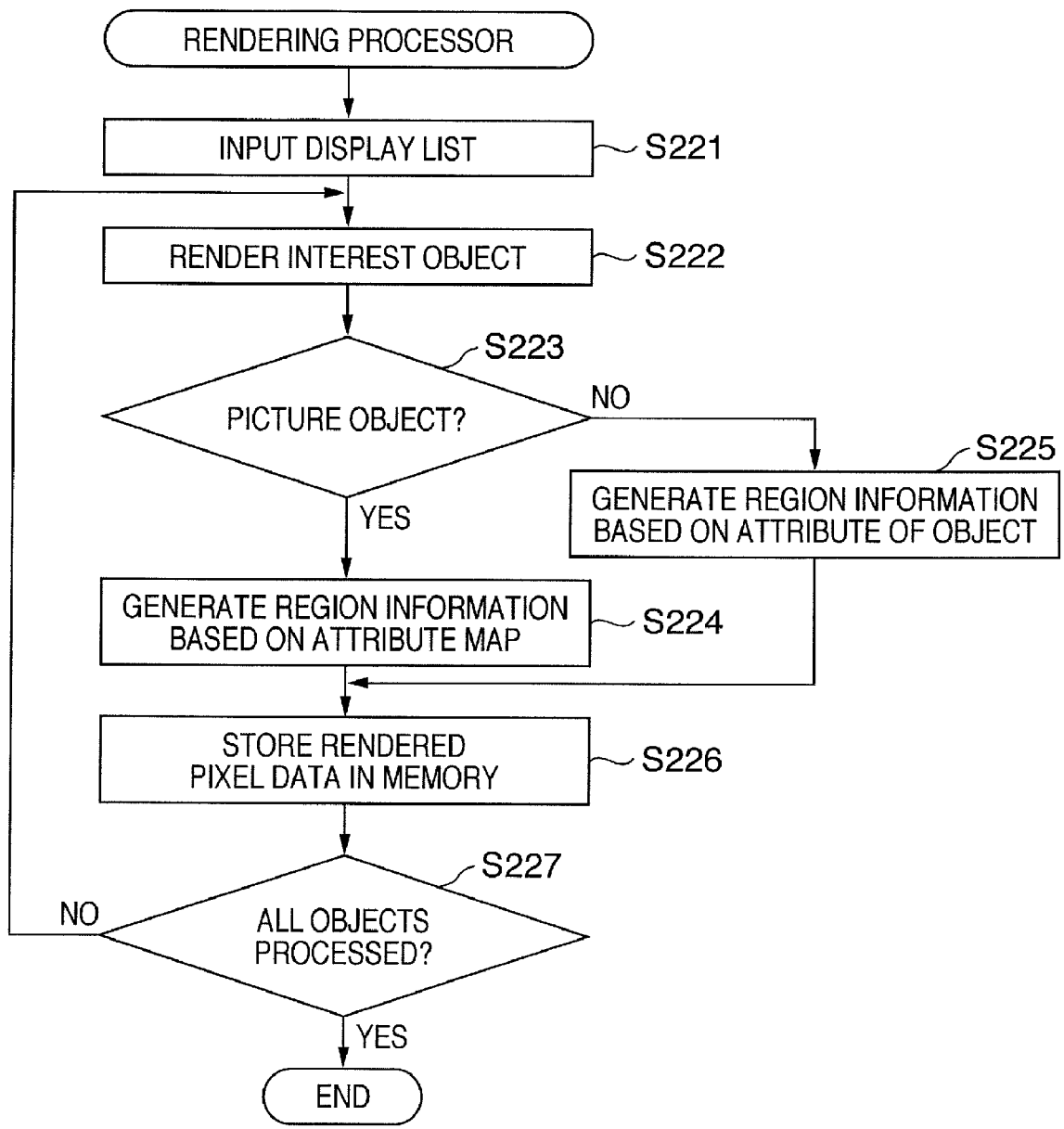
FIG. 11B is a flowchart showing the processing of a rendering processor.

FIG. 11A is a flowchart showing the processing of the processor 108 and region separation unit 503, and FIG. 11B is a flowchart showing the processing of the rendering processor 109.

The processor 108 inputs print data (S201), and generates a display list of an interest object (S202). The processor 108 checks if the interest object has a picture attribute (S203). If the interest object does not have a picture attribute, the process jumps to step S207.

If the interest object has a picture attribute, the processor 108 inputs that object to the region separation unit 503 (S204), and waits until an attribute map is stored in the memory 107 (S205). After the attribute map is stored in the memory 107, the processor 108 adds a link to the attribute map to the description of the display list corresponding to that picture object (S206).

The processor 108 then stores the display list in the memory 107 (S207), and checks if all objects have been processed (S208). If objects to be processed still remain, the process returns to step S202; otherwise, the process ends.

Upon reception of the picture object (S211), the region separation unit 503 executes region segmentation processing (S212), and stores region information obtained by the region segmentation processing in the memory 107 as an attribute map (S213). The flow then returns to step S211.

The rendering processor 109 inputs the display list (S221), and renders an interest object (S222). The rendering processor 109 checks it the interest object has a picture attribute (S223). If the interest object has a picture attribute, the rendering processor 109 generates region information with reference to the attribute map via the link described in the display list corresponding to the object (S224). If the interest object does not have a picture attribute, the rendering processor 109 generates region information based on the attribute of that object (S225). The rendering processor 109 stores pixel data including region information in the memory 107 (S227), and checks if all objects have been processed (S228). If objects to be processed still remain, the process returns to step S222; otherwise, the process ends.

As described above, when print data input from the computer 101 includes only an object of a picture attribute or an object of a picture attribute, which includes rasterized text, the text region and picture regions are separated, and the image processes are switched according to the region information. Therefore, image processes respectively suited to the text region and picture region can be applied, and a satisfactory print image with high image quality can be obtained.

Third Embodiment

Image processing according to the third embodiment of the present invention will be described hereinafter. Note that the same reference numerals in the third embodiment denote the same components as those in the first and second embodiments, and a detailed description thereof will be omitted.

Figure 12:
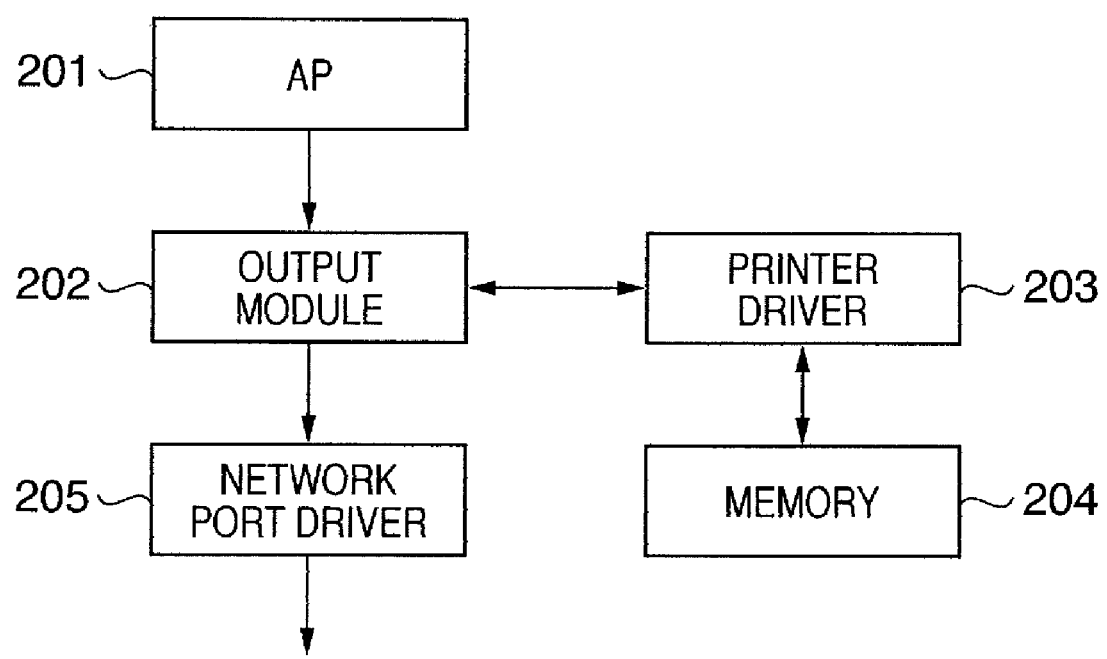
FIG. 12 is a block diagram for explaining the relationship between AP and a printer driver which run on a computer.

FIG. 12 is a block diagram showing the relationship between AP and a printer driver which run on a computer 101.

Upon reception of a print instruction, AP 201 sends graphics commands (GDI functions or the like) to an output module 202 provided by an OS. The output module 202 sends the graphics commands to a printer driver 203 corresponding to a printer designated by the user. The printer driver 203 generates print data (DDI functions or the like) according to the graphics commands, and stores the print data in a memory 204 as a work memory of the computer 101. Then, the printer driver 203 generates a print job by bracketing the print data by, e.g., Job Definition Format (JDF).

The output module 202 sends the print job received from the printer driver 203 to the printer designated by the user via a network port driver 205.

Figure 13:
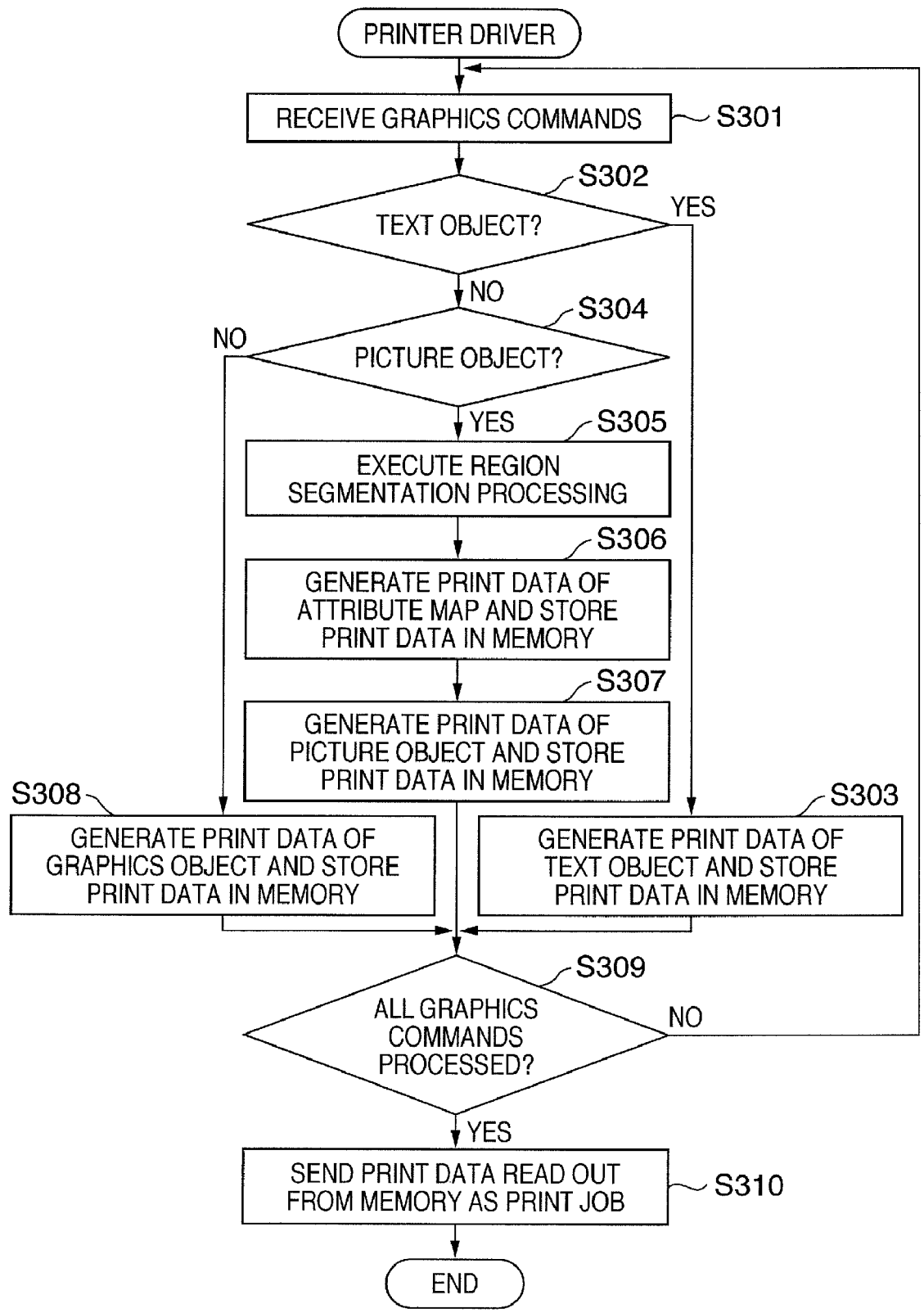
FIG. 13 is a flowchart showing the processing of a printer driver according to the third embodiment.

FIG. 13 is a flowchart showing the processing of the printer driver 203 of the third embodiment.

Upon reception of graphics commands (S301), the printer driver 203 checks if an object to be rendered has a text attribute (S302). If the object to be rendered has a text attribute, the printer driver 203 generates print data of the text object, and stores it in the memory 204 (S303).

If the object to be rendered does not have a text attribute, the printer driver 203 checks if the object to be rendered has a picture attribute (S304). If the object to be rendered has a picture attribute, the printer driver 203 executes region segmentation processing (S305). The printer driver 203 generates an attribute map based on region information obtained by the region segmentation processing, also generates its print data, and stores the print data in the memory 204 (S306). The printer driver 203 generates print data of the picture object and stores it in the memory 204 (S307). Note that the printer driver 203 associates the print data of the attribute map and picture object with each other.

If the object to be rendered has neither a text attribute nor a picture attribute, the printer driver 203 determines that object as a graphics object, generates its print data, and stores the print data in the memory 204 (S308).

The printer driver 203 repeats the processes in steps S301 to S308 until it is determined in step S309 that all graphics commands are processed. Upon completion of the processing of all the graphics commands, the printer driver 203 sends the print data read out from the memory 204 to the output module 202 as a print job (S310). Therefore, the print job is sent to the MFP 102.

Figure 14:
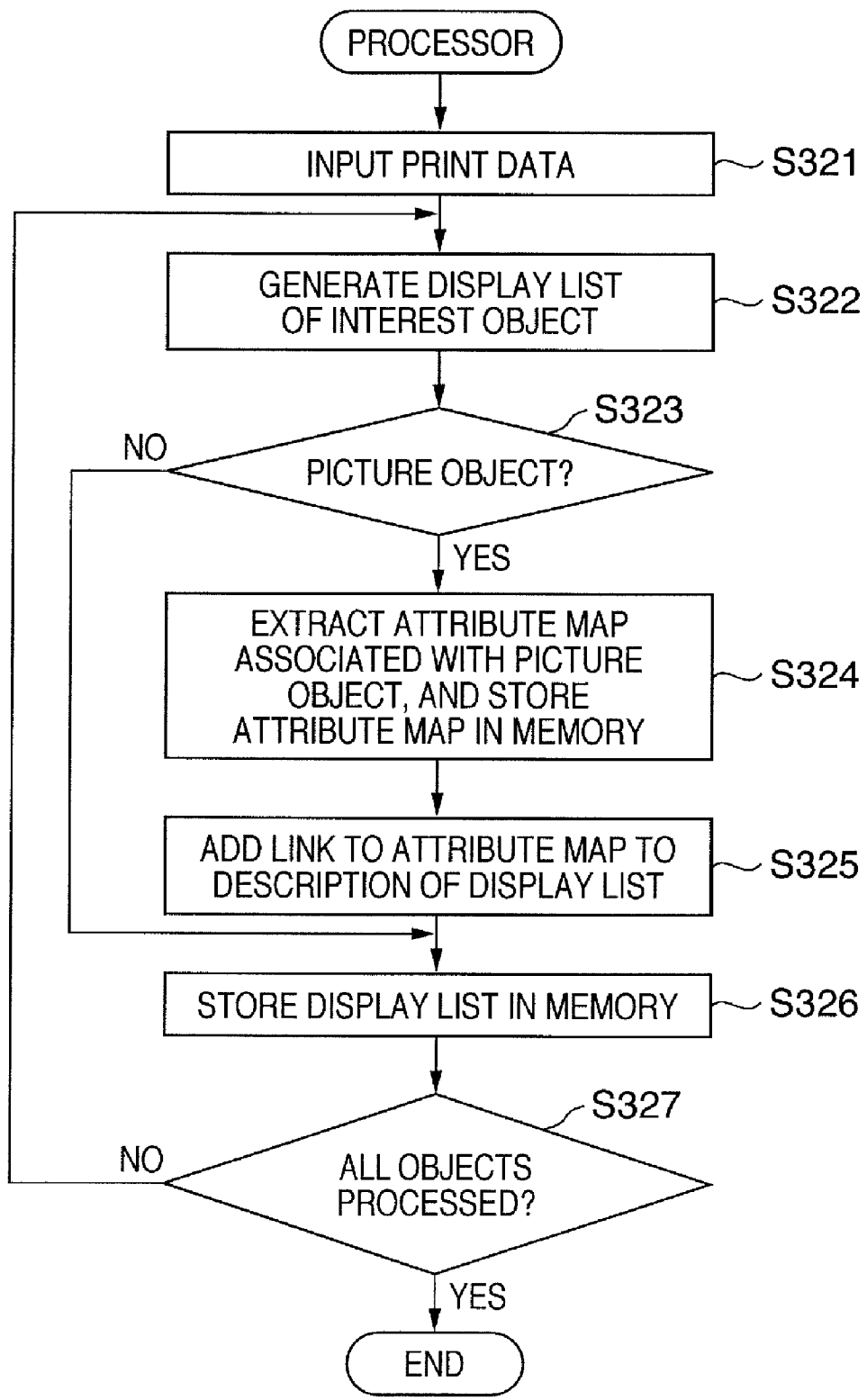
FIG. 14 is a flowchart showing the processing of a processor.

FIG. 14 is a flowchart showing the processing of the processor 108.

The processor 108 inputs the print data (S321), and generates a display list of an interest object (S322). The processor 108 checks if the interest object has a picture attribute (S323). If the interest object does not have a picture attribute, the process jumps to step S326.

If the interest object has a picture attribute, the processor 108 extracts the print data of the attribute map associated with that of the interest object, and stores the attribute map in the memory 107 (S324). The processor 108 adds a link to the attribute map in the description of the display list corresponding to the picture object (S325).

The processor 108 stores the display list in the memory 107 (S326), and checks if all objects have been processed (S327). If objects to be processed still remain, the process returns to step S322; otherwise, the process ends.

Since the processing of the rendering processor 109 is the same as that of the second embodiment, a detailed description thereof will be omitted.

As described above, when print data input from the computer 101 includes only an object of a picture attribute or an object of a picture attribute, which includes rasterized text, the text region and picture regions are separated, and the image processes are switched according to the region information. Therefore, image processes respectively suited to the text region and picture region can be applied, and a satisfactory print image with high image quality can be obtained.

Fourth Embodiment

Image processing according to the fourth embodiment of the present invention will be described hereinafter. Note that the same reference numerals in the fourth embodiment denote the same components as those in the first to third embodiments, and a detailed description thereof will be omitted.

A printer driver of a printer having a host-based printer function or an MFP generates a print image according to graphics commands from AP, and sends the print image to the printer or MFP. Upon rendering the print image, the printer driver switches subsequent image processes based on the attribute information of rendering objects, and applies suited image processes to a text region and picture region.

Figure 15:
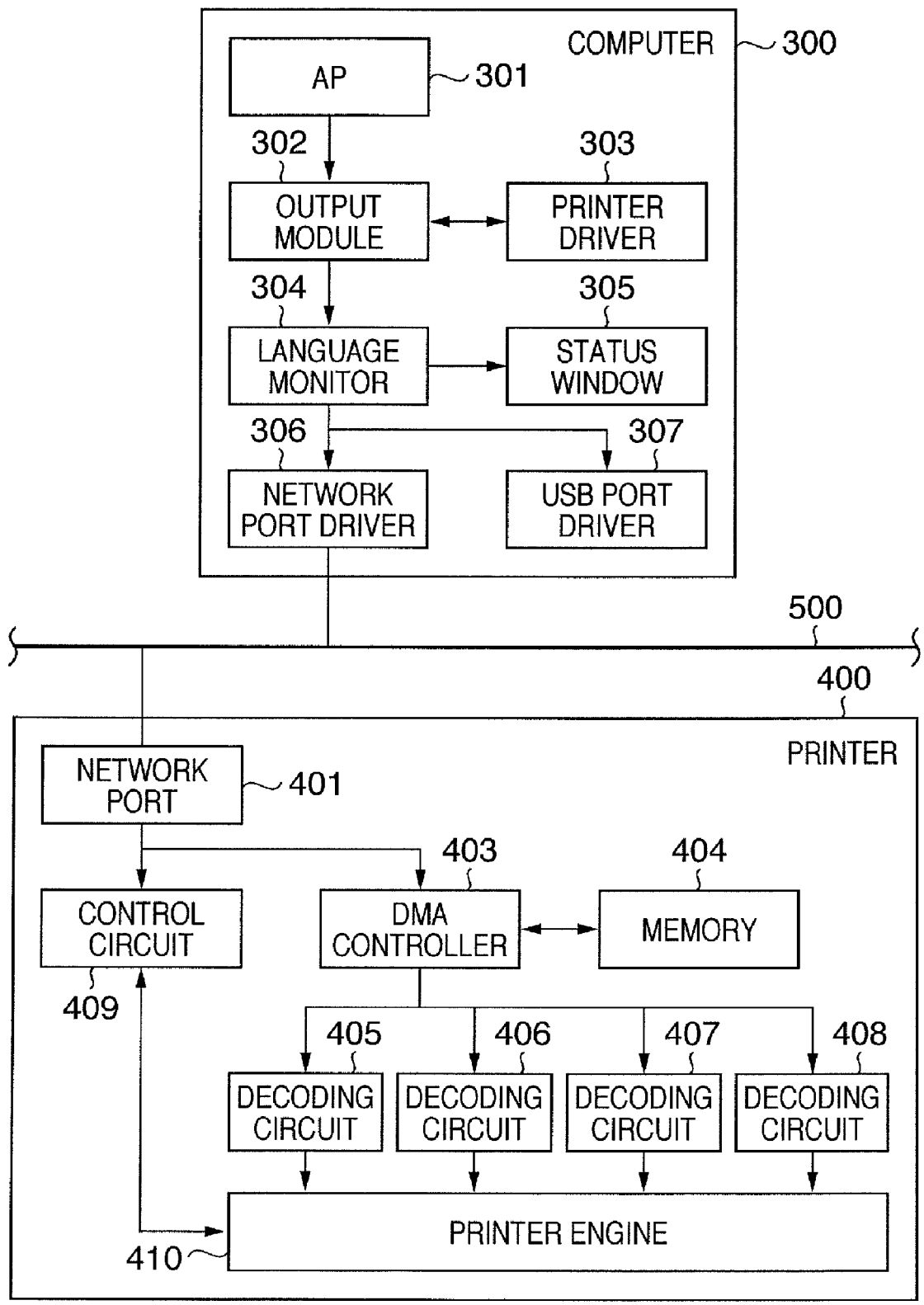
FIG. 15 is a block diagram showing the arrangement of a print system.

FIG. 15 is a block diagram showing the arrangement of a print system.

Upon reception of a print instruction, AP 301 which runs on a host computer 300 sends graphics commands to an output module 302. The output module 302 sends graphics command to a printer driver 303 corresponding to a printer 400 designated by the user.

The printer driver 303 interprets the graphics commands, and renders raster images. The printer driver 303 compresses raster image data for respective CMYK colors, and sends print data including compressed raster image data and printer control commands to a language monitor 304 via the output module 302.

Upon reception of the print data from the printer driver 303, the language monitor 304 determines if the printer 400 is located on a network 500 or is connected via, e.g., USB. If the printer 400 is located on the network 500, the language monitor 304 sends the print data to the printer 400 via a network port driver 306. On the other hand, if the printer 400 is connected via USE, the language monitor 304 sends the print data to the printer 400 via a USB port driver 307. The language monitor 304 displays the sending status on a status window 305.

Upon reception of the print data at a network port 401, the printer 400 stores the compressed raster image data included in the print data in a memory 404 via a DMA controller 403, and sends the printer control commands included in the print data to a control circuit 409.

Upon reception of the printer control commands, the control circuit 409 communicates with a printer engine 410 to feed a paper sheet, and starts up the printer engine 410. The DMA controller 403 inputs K component data of the compressed raster image data stored in the memory 404 to a decoding circuit 405, C component data to a decoding circuit 406, M component data to a decoding circuit 407, and Y component data to a decoding circuit 408. The decoding circuits 405 to 408 respectively decompress the compressed raster image data in synchronism with the operation of the printer engine 410 and input the decompressed raster image data to the printer engine 410.

The printer engine 410 develops toner images, transfers them onto a print sheet, and fixes the toner images, thus outputting a print image.

Figure 16:
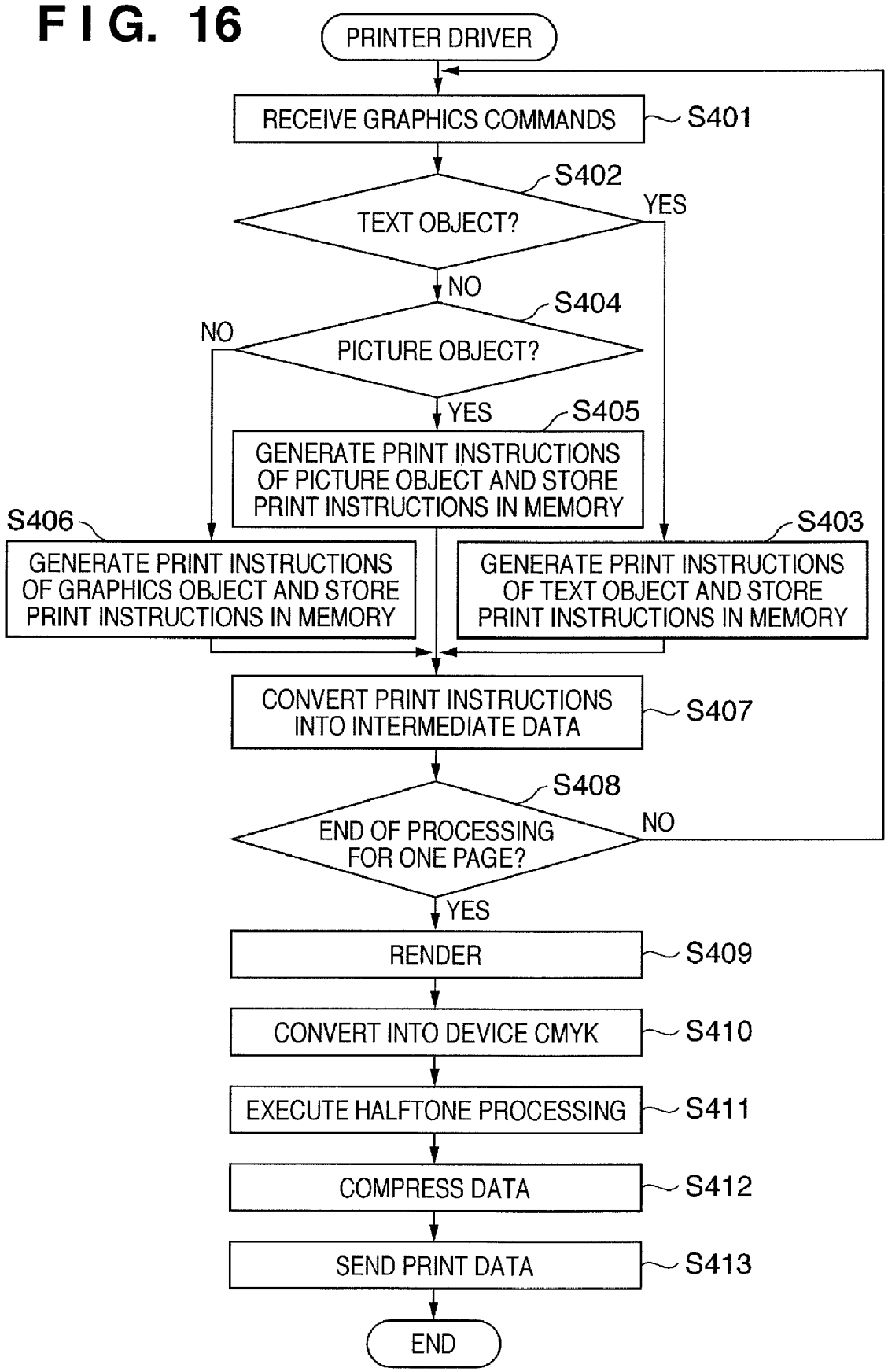
FIG. 16 is a flowchart for explaining the processing of a printer driver.

FIG. 16 is a flowchart for explaining the processing of the printer driver 303.

Upon reception of graphics commands (S401), the printer driver 303 checks if an object to be rendered has a text attribute (S402). If the object to be rendered has a text attribute, the printer driver 303 generates print instructions (e.g., DDI functions) of the text object, and stores them in the memory (S403).

If the object to be rendered does not have a text attribute, the printer driver 303 checks if the object to be rendered has a picture attribute (S404). If the object to be rendered has a picture attribute, the printer driver 303 generates print instructions of the picture object, and stores them in the memory (S405).

If the object to be rendered has neither a text attribute nor a picture attribute, the printer driver 303 determines that object as a graphics object, generates its print instructions, and stores the print instructions in the memory (S406).

The printer driver 303 then converts the print instructions into intermediate data and stores the intermediate data in the memory (S407). The printer driver 303 checks if processing for, e.g., one page is complete (S408). If the processing for one page is not complete yet, the process returns to step S401.

Upon completion of the processing for one page, the printer driver 303 renders raster images to be printed based on the intermediate data (S409). In this case, the printer driver 303 appends region information of a text attribute to pixels corresponding to the text object, that of a picture attribute to pixels corresponding to the picture object, and that of a graphics attribute to pixels corresponding to the graphics object.

The printer driver 303 converts the rendered raster images into device CMYK raster images of the printer 400 (S410). Upon this conversion, the printer driver 303 switches conversion tables based on the region information of respective pixels.

The printer driver 303 applies halftone processing to the CMYK raster images (S411), and compresses the raster image data that have undergone the halftone processing for respective CMYK planes (S412). The printer driver 303 sends print data obtained by appending printer control commands to the compressed raster image data to the output module 302 (S413).

However, as in the aforementioned case, when the AP 301 issues print instructions of a raster image or those of a scan image, rasterized text may be pasted on a picture image. Therefore, the image process suited to a picture region is applied to the print image, and the image quality of a text region may deteriorate. To solve this problem, the printer driver 303 of the fourth embodiment executes the same processing as in the third embodiment to the object of the picture attribute.

Figure 17A:
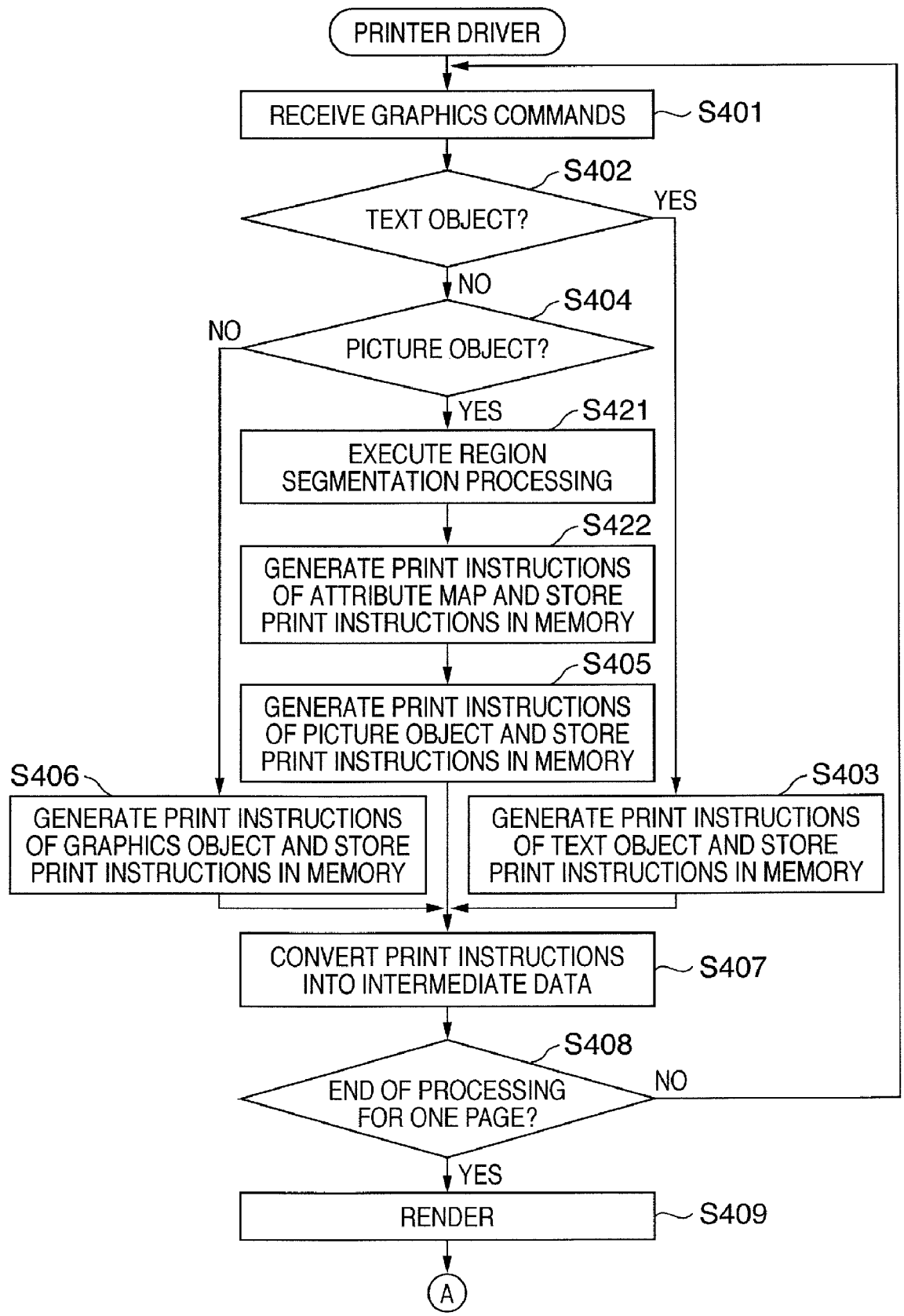

FIGS. 17A and 17B are flowcharts for explaining the processing of the printer driver 303 of the fourth embodiment. The same step numbers in FIGS. 17A and 17B denote the same processes as in FIG. 16, and a detailed description thereof will be omitted.

If the object to be rendered has a picture attribute, the printer driver 303 executes region segmentation processing (S421). The printer driver 303 generates an attribute map based on region information obtained by the region segmentation processing, also generates its print instructions, and stores the print instructions in the memory (S422). The printer driver 303 generates print instructions of the picture object and stores them in the memory (S405). Note that the printer driver 303 associates the print instructions of the attribute map and picture object with each other.

Furthermore, prior to the conversion into device CMYK data and the halftone processing, the printer driver 303 checks with reference to region information if an interest pixel belongs to a picture region (S423). In case of the pixel which belongs to a picture region, the printer driver 303 executes the conversion into device CMYK data and the halftone processing with reference to the attribute map (S424). That is, if the attribute map indicates a text region, the printer driver 303 switches a conversion table for the conversion into device CMYK data and the halftone processing from that for a picture region to that for a text region. The printer driver 303 repeats checking in step S423 and the processes in steps S411 and 412 or the process in step S424 until it is determined in step S425 that the processing for one page is complete.

As described above, when print data input from the AP 301 includes only an object of a picture attribute or an object of a picture attribute, which includes rasterized text, the text region and picture regions are separated, and the image processes are switched according to the region information. Therefore, image processes respectively suited to the text region and picture region can be applied, and a satisfactory print image with high image quality can be obtained.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100402, filed Mar. 31, 2006, which is hereby incorporated by reference herein in its entirety.

What is claimed is:

1. An image processing apparatus comprising:
an input section, arranged to input print data from the exterior;
a rendering section, arranged to render objects included in the print data to generate image data for print, wherein said rendering section appends attribute information indicating attributes of the objects to the image data for print of the objects, and stores the image data for print appended with the attribute information in a memory;
an extractor, arranged to extract image data indicating a picture attribute from the image data for print output from said rendering section;
a segmentation section, arranged to segment the image data extracted by said extractor into regions; and
a rewriting section arranged to rewrite attribute information of image data of a region of a text attribute, which is divided by said segmentation section, to a text attribute.

2. The apparatus according to claim 1, wherein said rewriting section overwrites the image data stored in the memory by the image data whose the attribute information is rewritten.

3. An image processing apparatus comprising:
an input section, arranged to input print data from the exterior;
an extractor, arranged to extract an object of a picture attribute from the print data;
a segmentation section, arranged to segment the object extracted by said extractor into regions, and to generate an attribute information map of the object; and
a rendering section, arranged to render objects included in the print data to generate image data for print, wherein when an object has an attribute other than a picture attribute, said rendering section appends attribute information indicating the attribute of the object to the image data for print of the object, and when an object has the picture attribute, said rendering section appends attribute information according to the attribute information map to the image data for print of the object.

4. An image processing apparatus comprising:
an input section, arranged to input graphics commands;
a determiner, arranged to determine an attribute of an object whose rendering is designated by the graphics commands;
a segmentation section, arranged to segment the object, for which a determination result of said determiner indicates a picture attribute, into regions, to generate an attribute information map of the object, and to associate the attribute information map and the object; and
a generator, arranged to generate print data including the object whose rendering is designated by the graphics commands and the attribute information map.

5. The apparatus according to claim 4, further comprising an output section arranged to output the print data to a printing device.

6. The apparatus according to claim 4, further comprising:
a rendering section, arranged to render objects included in the print data to generate image data for print, wherein said rendering section appends attribute information indicating attributes of the objects to the image data for print of the objects; and
an image processor, arranged to apply image processing corresponding to the attribute information to the image data for print, wherein said image processor applies image processing according to attribute information indicated by the attribute information map to a pixel whose attribute information indicates a picture attribute.

7. The apparatus according to claim 6, further comprising an output section arranged to output the image data for print to a printing device.

8. An image processing method comprising the steps of:
inputting print data from the exterior;
rendering objects included in the print data to generate image data for print;
appending attribute information indicating attributes of the objects to the image data for print of the objects, and storing the image data for print appended with the attribute information in a memory;
extracting image data indicating a picture attribute from the rendered image data for print;
segmenting the image data extracted in the extracting step into regions; and
rewriting attribute information of image data of a region of a text attribute, which is divided in the segmenting step, to a text attribute.

9. An image processing method comprising the steps of:
inputting print data from the exterior;
extracting an object of a picture attribute from the print data;
segmenting the object extracted by said extractor into regions, and generating an attribute information map of the object;
rendering objects included in the print data to generate image data for print; and
appending, when an object has an attribute other than a picture attribute, attribute information indicating the attribute of the object to the image data for print of the object, and appending, when an object has the picture attribute, attribute information according to the attribute information map to the image data for print of the object.

10. An image processing method comprising the steps of:
inputting graphics commands;
determining an attribute of an object whose rendering is designated by the graphics commands;
segmenting the object, for which the determination result indicates a picture attribute, into regions, generating an attribute information map of the object, and associating the attribute information map and the object; and generating print data including the object whose rendering is designated by the graphics commands and the attribute information map.

11. A computer-executable program stored on a computer-readable storage medium comprising program code causing a computer to perform an image processing method, the method comprising the steps of:
inputting print data from the exterior;
rendering objects included in the print data to generate image data for print;
appending attribute information indicating attributes of the objects to the image data for print of the objects, and storing the image data for print appended with the attribute information in a memory;
extracting image data indicating a picture attribute from the rendered image data for print;
segmenting the image data extracted in the extracting step into regions; and
rewriting attribute information of image data of a region of a text attribute, which is divided in the segmenting step, to a text attribute.

12. A computer-executable program stored on a computer-readable storage medium comprising program code causing a computer to perform an image processing method, the method comprising the steps of:
inputting print data from the exterior;
extracting an object of a picture attribute from the print data;
segmenting the object extracted by said extractor into regions, and generating an attribute information map of the object;
rendering objects included in the print data to generate image data for print; and
appending, when an object has an attribute other than a picture attribute, attribute information indicating the attribute of the object to the image data for print of the object, and appending, when an object has the picture attribute, attribute information according to the attribute information map to the image data for print of the object.

13. A computer-executable program stored on a computer-readable storage medium comprising program code causing a computer to perform an image processing method, the method comprising the steps of:
inputting graphics commands;
determining an attribute of an object whose rendering is designated by the graphics commands;
segmenting the object, for which the determination result indicates a picture attribute, into regions, generating an attribute information map of the object, and associating the attribute information map and the object; and
generating print data including the object whose rendering is designated by the graphics commands and the attribute information map.

14. A computer-readable storage medium storing a computer-executable program causing a computer to perform an image processing method, the method comprising the steps of:
inputting print data from the exterior;
rendering objects included in the print data to generate image data for print;
appending attribute information indicating attributes of the objects to the image data for print of the objects, and storing the image data for print appended with the attribute information in a memory;
extracting image data indicating a picture attribute from the rendered image data for print;
segmenting the image data extracted in the extracting step into regions; and
rewriting attribute information of image data of a region of a text attribute, which is divided in the segmenting step, to a text attribute.

15. A computer-readable storage medium storing a computer-executable program causing a computer to perform an image processing method, the method comprising the steps of:
inputting print data from the exterior;
extracting an object of a picture attribute from the print data;
segmenting the object extracted by said extractor into regions, and generating an attribute information map of the object;
rendering objects included in the print data to generate image data for print; and
appending, when an object has an attribute other than a picture attribute, attribute information indicating the attribute of the object to the image data for print of the object, and appending, when an object has the picture attribute, attribute information according to the attribute information map to the image data for print of the object.

16. A computer-readable storage medium storing a computer-executable program causing a computer to perform an image processing method, the method comprising the steps of:
inputting graphics commands;
determining an attribute of an object whose rendering is designated by the graphics commands;
segmenting the object, for which the determination result indicates a picture attribute, into regions, generating an attribute information map of the object, and associating the attribute information map and the object; and
generating print data including the object whose rendering is designated by the graphics commands and the attribute information map.

* * * * *